US011312246B2

United States Patent
Bowman et al.

(10) Patent No.: US 11,312,246 B2
(45) Date of Patent: Apr. 26, 2022

(54) CONTROL OF CLUTCHLESS VEHICLE ELECTRONIC SHIFT TRANSMISSIONS OPERATING AS BI-DIRECTIONAL POWER TRANSFER DEVICES

(71) Applicant: ePower Engine Systems, Inc., Florence, KY (US)

(72) Inventors: Jay J. Bowman, Florence, KY (US); Andrew Bowman, Florence, KY (US)

(73) Assignee: ePower Engine Systems, Inc., Florence, KY (US)

( * ) Notice: Subject to any disclaimer, the term of this patent is extended or adjusted under 35 U.S.C. 154(b) by 208 days.

(21) Appl. No.: 16/577,016

(22) Filed: Sep. 20, 2019

(65) Prior Publication Data
US 2020/0094695 A1 Mar. 26, 2020

Related U.S. Application Data

(60) Provisional application No. 62/734,698, filed on Sep. 21, 2018.

(51) Int. Cl.
*B60L 50/61* (2019.01)
*B60L 7/10* (2006.01)
(Continued)

(52) U.S. Cl.
CPC .............. *B60L 50/61* (2019.02); *B60L 7/10* (2013.01); *F16D 3/12* (2013.01); *F16D 3/52* (2013.01); *B60L 7/14* (2013.01); *B60L 50/51* (2019.02)

(58) Field of Classification Search
CPC ............... B60L 50/61; B60L 7/10; F16D 3/52
See application file for complete search history.

(56) References Cited

U.S. PATENT DOCUMENTS

| 4,691,148 A | * | 9/1987 | Nicholls | .................. B60L 7/12 |
| | | | | 318/12 |
| 5,214,358 A | * | 5/1993 | Marshall | ............. B60L 15/2054 |
| | | | | 318/139 |

(Continued)

FOREIGN PATENT DOCUMENTS

CN 1974262 A 6/2007

OTHER PUBLICATIONS

The International Search Report and the Written Opinion of the International Searching Authority for International Application No. PCT/US2019/052133, 12 pages.

*Primary Examiner* — Jonathan Ng
*Assistant Examiner* — James J Triggs
(74) *Attorney, Agent, or Firm* — Alan G. Towner; Leech Tishman Fuscaldo & Lampl

(57) ABSTRACT

Controlled clutchless shifting of multi-ratio geared electronic shift transmissions coupled directly to the electrical prime mover of a vehicle are disclosed. The adaptive control of electrically shifted manual transmissions incorporated into power-split series electric hybrid heavy vehicles operating over heavy duty drive cycles utilizes a direct coupling assembly that enables bi-directional energy transfer and power transport. An electronic shift transmission provides power amplifying or de-amplifying bi-directional intelligently controlled valve or pathway for available terrain potential or kinetic energy of a rolling mass of a vehicle, while retaining the original function of a transmission by increasing or decreasing mechanical rotating energy of the propulsion power to the rear wheels of a vehicle.

20 Claims, 7 Drawing Sheets

(51) Int. Cl.
    *F16D 3/12*     (2006.01)
    *F16D 3/52*     (2006.01)
    *B60L 50/51*     (2019.01)
    *B60L 7/14*     (2006.01)

(56) References Cited

U.S. PATENT DOCUMENTS

| | | | |
|---|---|---|---|
| 5,323,868 A * | 6/1994 | Kawashima | B60K 6/46 |
| | | | 180/65.245 |
| 5,951,436 A | 9/1999 | Kim | |
| 6,124,690 A * | 9/2000 | Yano | B60L 50/15 |
| | | | 318/376 |
| 6,205,379 B1 * | 3/2001 | Morisawa | B60W 10/26 |
| | | | 701/22 |
| 6,209,672 B1 * | 4/2001 | Severinsky | B60W 10/08 |
| | | | 180/65.23 |
| 6,234,932 B1 * | 5/2001 | Kuroda | B60W 20/00 |
| | | | 477/3 |
| 6,651,759 B1 * | 11/2003 | Gruenwald | B60L 50/40 |
| | | | 180/65.245 |
| 8,783,396 B2 | 7/2014 | Bowman | |
| 2004/0238244 A1 * | 12/2004 | Amanuma | B60W 10/08 |
| | | | 180/65.225 |
| 2010/0312427 A1 * | 12/2010 | Ueno | F02D 29/02 |
| | | | 701/22 |
| 2010/0324765 A1 | 12/2010 | Iida et al. | |
| 2013/0102437 A1 * | 4/2013 | Ichikawa | B60K 6/383 |
| | | | 477/5 |
| 2016/0065073 A1 * | 3/2016 | Katsuki | B60L 15/007 |
| | | | 323/271 |
| 2017/0021820 A1 | 1/2017 | Ogawa | |

\* cited by examiner

CONTROL OF CLUTCHLESS VEHICLE ELECTRONIC SHIFT TRANSMISSIONS OPERATING AS BI-DIRECTIONAL POWER TRANSFER DEVICES

CROSS REFERENCE TO RELATED APPLICATION

This application claims priority from U.S. Provisional Application Ser. No. 62/734,698 filed Sep. 21, 2018, which is incorporated herein by reference.

FIELD OF THE INVENTION

The present invention relates to the control of clutchless vehicle electronic shift transmissions operating as bi-directional power transfer devices.

BACKGROUND

Current state of the art heavy truck transmissions make use of a clutch when a vehicle must come to a complete stop to compensate for the continuous rotational operation of the fossil fueled engine. The clutch may be actuated by a driver or by a transmission control module of the vehicle. When operated by a driver, skill is required for the efficient and safe operation of a heavy truck.

State of the art automatic transmissions used in a heavy duty trucks utilize a fluid coupler device such as a torque converter to enable the truck to come to a complete stop while the engine remains running. The torque converter also provides de-torque of the drive engine to enable shifting of a multi-geared transmission. State of the art hydrocarbon fueled heavy trucks utilize a clutch to decouple the rotating engine from the transmission during a complete stop of a vehicle, thus allowing the engine to continue rotating at a predetermined idle speed.

Certain state of the art lighter automobiles have no clutch, no hydraulic coupling and no traditional gear box. All of the gears are at a fixed ratio that never changes. Two electric motors and an engine are connected together through a power-split planetary gear device, thereby eliminating the need for a clutch or torque converter.

Current state of the art electronic shift manual transmissions communicate over a J1939 network with hydrocarbon fueled engines to coordinate the de-torque and speed of the engine to allow for the seamless automatic or manual shifting of a transmission.

State of the art transmissions connected to hydrocarbon fueled engines contribute mechanical torque, multiplying gear ratios to improve the gradeability of and maintain speed over a highway drive cycle with or without driver intervention. However, they do not contribute to or improve the ability of a heavy vehicle to accumulate and store terrain potential or kinetic energy available to a rolling mass over a highway drive cycle.

State of the art electronic shift manual transmissions may retain an operating clutch to transfer power between the prime mover and the transmission, even though there may not be a clutch pedal operated by a driver. The RPM of the vehicle engine, when transitioning from a stop, slowly increases or decreases during a complete stop. The electronically controlled clutch engages and disengages, similar to clutch slipping of manual transmissions. Operating such an equipped vehicle for periods of time between idle and 1,000 RPM results in overheating of the clutch and can generate warning signals that indicate that the clutch and it is getting hot from the induced slippage. Hill holding capability of such a system also entails clutch slippage to prevent backwards movement of the vehicle when stopped on or starting on an incline. This slippage creates heat which is detrimental to the operation and longevity of the clutch system.

U.S. Pat. No. 8,783,396, which is incorporated herein by reference, discloses hydrocarbon fueled-electric series hybrid propulsion systems that may be adapted to include the clutchless bi-directional power transfer systems of the present invention.

SUMMARY OF THE INVENTION

The present invention relates to controlled clutchless shifting of multi-ratio geared electronic shift transmissions, coupled directly to the electrical prime mover of a vehicle. The adaptive control of electrically shifted manual transmissions incorporated into power-split series electric hybrid heavy vehicles operating over heavy duty drive cycles utilizes a direct coupling assembly that enables bi-directional energy transfer and power transport. An electronic shift transmission provides power amplifying or de-amplifying bi-directional intelligently controlled valve or pathway for available terrain potential or kinetic energy of a rolling mass of a vehicle, while retaining the original function of a transmission by increasing or decreasing mechanical rotating energy of the propulsion power to the rear wheels of a vehicle.

An aspect of the present invention provides a vehicle power transfer system comprising an electric drive motor, an electric power controller structured and arranged to selectively feed electrical current to the electric drive motor and receive electrical current from the electric drive motor, an electric generator connected to the electric power controller, at least one battery connected to the electric power controller, an electronic shift transmission, and a direct coupling assembly between an output drive shaft of the electric drive motor and an input drive shaft of the electronic shift transmission structured and arranged to transfer torque from the output drive shaft of the electric drive motor to the input drive shaft of the electronic shift transmission in a drive mode, and to transfer torque from the input drive shaft of the electronic shift transmission to the output drive shaft of the electric drive motor in an energy collection mode.

Another aspect of the present invention provides a direct coupling assembly for use in a vehicle power train assembly, the direct coupling assembly comprising a first coupling hub structured and arranged for driving connection to an output shaft of an electric drive motor, a second coupling hub structured and arranged for driving connection to an input drive shaft of an electronic shift transmission, and a connecting spring contacting the first and second coupling hubs structured and arranged to transfer torque from the first coupling hub to the second coupling hub in a drive mode, and to transfer torque from the second coupling hub to the first coupling hub in an energy collection mode.

These and other aspects of the present invention will be more apparent from the following description.

DETAILED DESCRIPTION

Figure 1:
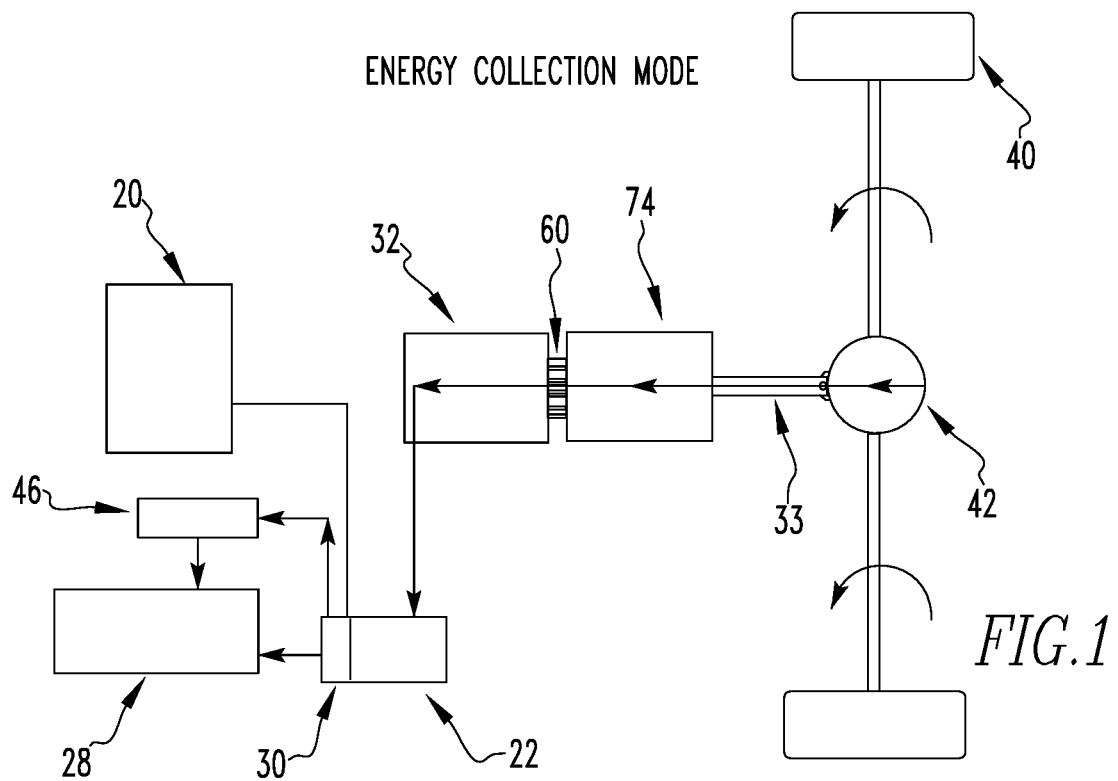
FIG. 1 is a schematic diagram illustrating the operation of a clutchless vehicle electronic shift transmission of the present invention operating in an energy collection mode.

An embodiment of the invention creates bi-directional operation when mechanical energy created by the rolling mass of a vehicle is transferred from the wheels of the vehicle back to an electric drive motor. The energy is transferred from the wheels through an axle to differential ratio gearing, with the rotating energy transferred to a spinning drive shaft connected to a rear yoke of a transmission containing one or more movable ratio gear sets. The ratio gear sets are used to amplify or de-amplify terrain potential and kinetic energy that are transferred through the gear set to an output shaft of the transmission. The output shaft transfers the terrain potential and kinetic energy through a direct coupling designed to absorb road shock and changes between positive and negative torque shock loads. The input/output shaft of the electric drive motor utilizes the mechanical spinning energy that has been transferred to the shaft to produce electrical current and generate usable power.

In one embodiment of the present invention, when used with standard ABS brake sensors communicating over a J1939 on board network or other type of network, an intelligent system such as an artificial intelligence (AI) neural network interfacing with braking devices or its own detection of the rotating position of a brake drum or caliper used to stop a vehicle allows for a substantial decrease in braking response time and braking distance. This is accomplished through directing the instantaneously available regenerative breaking power of a power-split series electric hybrid heavy vehicle. The power can be increased or decreased through the multi-ratio gearing available in an electronic shift manual transmission. The braking power is available to slow down the vehicle well within a millisecond of releasing the throttle mechanically or electronically and nearly a second before the conventional mechanical braking power is available resulting in reduced controlled stopping distances.

In another embodiment of the invention, the electric drive motor of a power-split series electric hybrid heavy vehicle's rotation is stopped in order to allow the vehicle to come to a complete stop without disconnecting the transmission via a clutch from the prime mover. This eliminates the power draw of the electric drive motor, increasing efficiency of the vehicle. The elimination of a clutch in an electronic shift transmission through direct coupling of the transmission to the prime mover eliminates slippage, the requirement for driver skill connected with clutch usage and clutch wear and tear, while reducing emissions over conventional heavy vehicles.

An embodiment of the invention comprises of one or more inputs from sensors either vehicle or cloud based that run through a neural network containing algorithms designed to create a desired function or functions that are output to one or more logic controlled switches to enable selection of a desired gear ratio of a multi ratio transmission for optimal torque and speed to navigate terrain changes and traffic patterns, while multiplying any terrain potential energy available over a highway drive cycle in power-split series electric hybrid heavy vehicle, performed autonomously or semi autonomously and in real time.

In one embodiment of the present invention, an AI controlled multi-channel power divider is used to distribute power collected in a power-split series electric hybrid vehicle consisting of at least one or multiple generators, fuel cells, battery packs, capacitors, resistors, along with any type of energy storage devices, powering an AC motor connected to the drive wheels via a multi ratio electronic shift operated as bi-directional power device with a motor controller capable of developing regenerative electrical power within microseconds of the de-torque of an electrical drive motor.

Other embodiments of the invention may include global positioning satellite or GPS data supplied to an AI controlled multi-channel power divider either by streaming from cloud based data bases via 3G/4G/5G mobile communication networks, live streaming from space based satellites or a vehicle based network mapping storage data base of a line haul or highway route or any other required drive cycle. This information is then used by the AI controlled multi-channel power divider to signal an AC motor controller to de-torque and speed match for shifting the electronic shift actuators of an electronic shift multi ratio transmission to increase or decrease the amount of terrain potential energy available for use or storage. The ability to react in real time to potential energy changes and select a beneficial ratio to amplify or de-amplify available power in all forms in an efficient manor while aiding in control of the thermal dissipation of a power storage system in a power-split series electric heavy hybrid vehicle.

One embodiment of the invention provides input from road positioning sensors such as machine vision cameras, lidar and frequency modulated radar, as well as global positioning satellites. This enables the AI controlled multi-channel power divider to control much of the system-level operation. These controls comprise measuring and managing system power requirements, and overall control of and the thermal dissipation of various electrical devices. The system supplied with these additional inputs and machine learning algorithms operating an onboard or cloud based neural network has the ability operate as a fully or partially autonomous bi-directional port, thus improving and enabling the collection, storage of and use of terrain potential energy while retaining its original function of torque multiplication for improved gradeability over a line haul or highway drive cycle. Position awareness of location over a highway drive cycle enables efficient power flow through an electronic shift manual transmission as a bi-directional device as one of multiple power devices control and storage devices in a power-split series electric hybrid heavy vehicle operating over a highway drive cycle.

The present invention provides a method of operating an electronic shift transmission in a direct coupled architecture that enhances the performance and increases the functionality an electronic shift manual transmission used in a power-split series electric hybrid heavy vehicle. An embodiment of the invention intelligently controls the shifting of an electronic shift manual transmission enabling it to act as a system integral bi-directional power flow device in the direct collection, generation, combination, storage and distribution of power flow among multiple power sources or devices, while conditioning the power being distributed between the devices for optimal control and collection of generated, stored or potential and kinetic energy available in a power-split series electric heavy hybrid vehicle. In addition, the present system allows a driver to override the automatically controlled gear ratio selection and shifting in a power-split series electric hybrid heavy vehicle.

By expanding the AI data sources available for comparison, the control over a selected gear ratio of an electronic shift mechanical transmission can enable the use of a transmission as an integral device allowing bi-directional control over the power collected from terrain potential and kinetic energy supplied to a DC storage device in both charge and discharge cycles operating in a power-split series electric heavy hybrid vehicle, a vehicle that has a combined tractor trailer weight of at least 32,000 lb. Increases and decreases of potential energy collection in a highway drive cycle may be accomplished by adding a layer of AI control to an electric shift transmission control module (TCM) used to select optimal gears and ratios for dissipation of, or increased collection of, terrain potential and kinetic energy along with the proper gear ratio selection to optimize gradeability and startability of a power-split series electric hybrid heavy vehicle.

The present invention also provides a device and method of operating an electric shift manual transmission without use of a clutch to disengage the rotating drive power of a vehicle, thereby increasing the fuel efficiency and reducing emissions of a vehicle. Direct connection of an electric shift manual transmission to an electric drive motor produces regenerative power caused by minute as well as large terrain or road grade changes and the large rolling mass kinetic energy temporal variations from the acceleration/deceleration of a vehicles transmission acting as a bi-directional power flow device. The system may utilize a condition aware, intelligent signal operating an electronic shift manual transmission with one or more inputs and output channels to capture regenerative energy available from a large rolling mass traveling over terrain with altitude changes in high definition or decelerations of a power-split series electric hybrid heavy vehicle operated over a highway drive cycle. Sensory inputs along with AI algorithms operating and communicating with an electronic shift transmissions TCM over a vehicle onboard network may be used to control the speed, acceleration and braking of a power-split series electric hybrid heavy vehicle in an autonomous or semi-autonomous mode of operation.

The AI control of the electric shift manual transmission device may optimize and electrically control the power flows among several energy sources while participating in the management of thermal dissipation of a battery or battery pack electrical storage system in a power-split series electric hybrid heavy vehicle operating over a predetermined drive cycle. AI control of an electronic shift transmission as part of a multiple power supplied, multiple power storage devices used in a power-split series hybrid heavy vehicle operating over a highway drive cycle is provided.

The present invention also provides a method of using an electronic shift manual transmission to dissipate regenerative power when an electrical storage device is at a high state of charge or preset temperature protection setting is reached. An electric shift manual transmission with additional interactive control may be used within a vehicle containing multiple power sources such as a power-split series electric hybrid heavy haul vehicle operating over a highway drive cycle that contributes to a system approach that regulates the charging and discharging of a DC storage device to desired levels and rates.

The present invention further provides a method utilizing an electronic shift manual transmission to reduce and control the oxygen and hydrogen recombination for some batteries when a battery uses a recombination of oxygen and hydrogen to produce an electrical property, is at or close to a desired state of charge by using two channels of the device directed by the condition aware signal of a control device at optimal rates and frequencies divided by and recombined by the invention to a dc buss used for charging or a breaking resistor. Conditioning, distributing and controlling the power in a shared power network containing an electronic shift manual transmission operating in a power-split series electric hybrid heavy vehicle can aid in the control of the thermal dissipation of connected power devices.

An embodiment of the method of control and direct coupling of an electronic shift manual transmission containing additional sensory input can allow for close platooning of several power-split series electric hybrid heavy vehicles in a safe and efficient form through the extremely fast reaction times if the invention over power control and other useful devices, millisecond response times are normal reaction times for the power electronics and neural network algorithms used in the invention.

Figure 2:
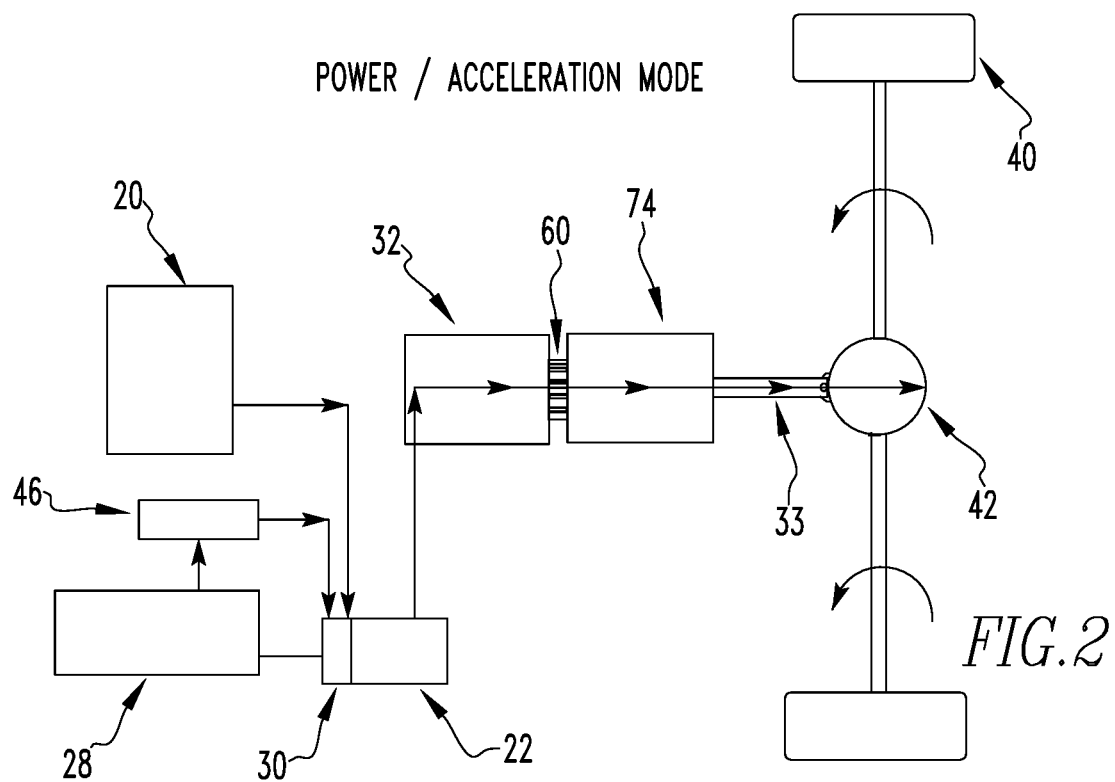
FIG. 2 is a schematic diagram illustrating the clutchless vehicle electronic shift transmission of FIG. 1 operating in a power/acceleration mode.

FIGS. 1 and 2 illustrate the energy flow of an electronic shift manual transmission used as a bi-directional port as an integral part of the energy collection and normal power mode of a power-split series electric hybrid heavy vehicle. In the power/acceleration mode shown in FIG. 1, a reverse path is formed. Power from the generator 20 and the battery pack 28 is blended by the AI controlled multi-channel power divider 30, which may also utilize power from a capacitor bank 46. The blended power is supplied to the variable frequency drive 22, utilized to power the electric drive motor 32. The rotational energy is then direct coupled 60 to the electronic shift transmission 74, through a drive shaft 33, and into the differentials ratio gear set 42 via an axle to the rear wheels 40 of the vehicle.

In the energy collection mode shown in FIG. 2, rotational energy of the rolling mass is transmitted by the wheels 40, through the ratio geared differential 42, along a drive shaft 33, into the ratio gear sets contained within the electronic shift transmission 74, through the direct coupler 60, to the drive motor/generator 32. The generated power flows to the AI controlled multi-channel power divider 30, where power flow path to the generator 20 is blocked, allowing the variable frequency drive 22, also acting as a bi-directional port, to transmit a controlled current power flow into the battery or battery pack 28 for storage. A parallel or series capacitor bank arrangement may also be utilized for the temporary storage and regulation of power 46.

Figure 3:
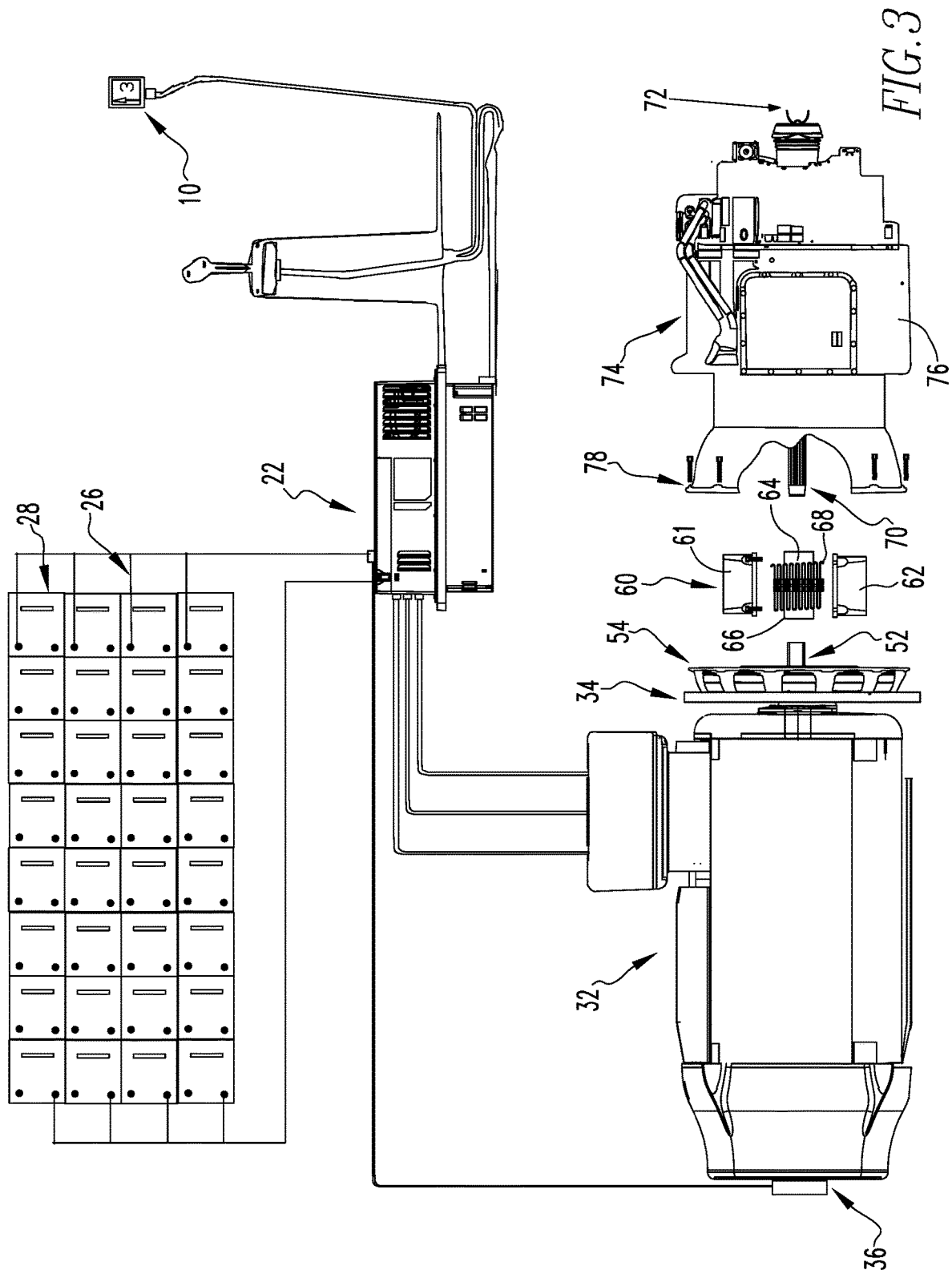
FIG. 3 is a partially schematic side view illustrating components of a clutchless vehicle electronic shift transmission capable of operating as a bi-directional power transfer device in accordance with the present invention.

FIG. 3 shows an embodiment of the invention used within a power-split series electric hybrid heavy vehicle. The electric drive motor 32 is connected via an adapter plate 34 to a modified bell housing 54 through a keyed SAE machined output shaft 52 that is inserted into a direct coupling assembly 60. Bi-directional mechanical power is transferred from the hub 66 through a grid assembly that allows for the dissipation of road shock, positive torque and negative torque dissipation produced by a moving vehicle onto and through the SAE automotive splined hub 64 with matching grid machining. The splining of 64 matches the splined modified input shaft 70 of a stock electric shift manual transmission 74. The grid coupling may use a grease packing for lubrication purposes that is protected from environmental contamination by a split housing assembly 61, 62. The split design of the housing 61, 62 allows for maintenance and inspection of the coupler at regular intervals as part of a preventative maintenance program or schedule. An encoder 36 attached to the rear of the output shaft of the electric drive motor 32 is used to broadcast the precise shaft position and rotation to an on board network to be used by various power electronic devices, e.g., using AI algorithms, to provide precise control and flow of terrain potential energy in and out of a power-split series electric hybrid heavy vehicle.

In power collection mode, the electronic shift transmission 74 operates in tandem with other devices and software over a network to control and distribute available potential energy from the rolling mass of the vehicle. The terrain potential energy is transferred from the rear wheels of the vehicle via a geared differential by way of a drive shaft to the rear yoke 72 of the electronic shift transmission 74 consisting of several multi stepped gear ratios. An AI control device 30 mounted on the variable frequency drive 22 and connected to the on board network or cloud based network through a connection 19 determines the preferred geared ratio to regulate the power generated by the drive motor 32 during a terrain event. When acting as a power generator, the drive motor 32 produces power from the available potential energy of the rolling mass. The electronic shift transmission 74 may comprise multiple gears that are selectively engaged during the energy collection mode. A higher gear ratio may be selected during the energy collection mode when the at least one battery 28 is more fully charged, and a lower gear ratio may be selected during the energy collection mode when the at least one battery 28 is less fully charged, for example, the higher gear ratio may be a relatively high overdrive ratio, and the lower gear ratio may be a lower overdrive ratio. The regenerative energy is regulated in order to assist in the thermal dissipation of any storage device 28, 26 and in controlling the state of charge of any on board storage device such as a battery or battery pack. The AI software and device 30, utilizing layered back propagation algorithms operating over an on-board or cloud based neural network architecture, monitors input data from GPS, battery SOC, battery pack temperature, gen-set or fuel cell state of power production. Based on the data inputs, combined gross vehicle weight (CGVW), driver input position through the manual shift selector 10 and the vehicle's position on a given route, the control device 30 reads and activates shifting algorithms stored within the TCM 76 and selects the appropriate gear ratio. The data comparisons and back propagation algorithms, along with the power electronic devices micro-second reaction times, contribute to very efficient collection of terrain potential energy while maintaining desired battery 28, 26 storage SOC and temperature. The selected gear ratio selection and active shifting movement may be displayed to a driver through a visual and audio display 10 mounted on a dash board.

In normal propulsion power mode, the electrical power either generated or stored on-board the vehicle is routed through the variable frequency drive 22 to supply controlled power to the electric drive motor 32 to propel the vehicle. The AI controlled multi-channel power divider/combiner 30 determines the contributing amount and source of the power to be routed to the variable frequency drive 22 to supply power to the electric drive 32. From the drive motor 32 propulsion power transfers to the electronic shift transmission 74 secured by means of an adapter plate 34, connected to a modified bell housing 54, coupled to the stock bell housing of the transmission 74. An output shaft 52 of the drive motor connected into a like-machined coupling hub 26 with matched coupling hub 24 machined to match the modified input shaft 64 with road dampening and torque transfer buffering supplied by a matching steel grid connection 24 that is contained within an environmental protection cover 44 that retains lubricating grease, provides for maintenance and inspection of the coupling. The electronic shift transmission 74 comprise a (TCM) transmission control 76 module that is network connected via 19 broadcasting requested shifting ratios and information over the network. This shift request is recognized by the AI controlled multi-channel power divider/combiner 30 where algorithms determine the preferred gear ratio selection to propel the vehicle with real time condition and route position awareness of the vehicle. Shifting is accomplished by the AI controlled multi-channel power divider/combiner 30 by de-torque and speed matching of the drive motor 32 to the speed of the input shaft 64 and associated gears of the electronic shift manual transmission 74 by signaling the variable speed drive 22 to manipulate the torque and speed of the drive motor 32 to match the torque and speed of the transmission 74, permitting the TCM 76 to activate the appropriate electronic shift mechanism, completing the power transmission via the geared ratios, output yoke 72, drive shaft, rear differential and drive wheels of the vehicle. In this mode, upshifts and downshifts are performed autonomously based on the AI controlled multi-channel power divider/combiner 30 signaling and transmission 76 conditions.

Channel two of an AI controlled multi-channel power divider/combiner 30 depicted in this embodiment enables capture of minute and large changes in terrain elevations along with slight and major speed changes of a power-split series electric heavy hybrid vehicle operating at a highway drive cycle or any other required drive cycle. Inputs of data received from several constant or changing, on-board or cloud-based sensor sources are received by or stored locally by the AI controlled multi-channel power divider/combiner 30 the device manipulates the data supplied through several layers of receptors with the weighted sums filtered and processed by receptors and algorithms creating an intelligent, condition-based awareness signal. This signal is then sent through the proper output gate of the controller/divider 30, connected to one of the available channels to a bi-directional IGBT gate driver creating the proper PWM signal for each real time changing condition of the drive cycle. An algorithm-based signal simultaneously transmits over a two-wire vehicle can network port, contained within cable 17 to the electronic manual shift transmissions clutchless shift control module TCM 76. The energy manipulation path contained within 74 is then actuated by shifting into the proper multi-ratio gear sets to optimize and or dissipate all or a portion of the potential energy collected from the rolling mass of the vehicle. This is accomplished within milliseconds of the real time condition being identified by the controller/divider 30. The present system, when used as a bi-directional port, preforms a new and vital role as an integral part of the energy collection system, while still retaining the ability to transmit optimal normal drive power in the power mode of a power-split series electric hybrid heavy vehicle. The regulation of the potential energy path used in an energy collection system includes, but is not limited to, controlling the rate of charging and discharging of a given DC storage system 28, 26, controlling and aiding the thermal dissipation of 28, 26 or in certain situations directing the flow of excess power to a braking resistor. The braking resistor may be connected as a subsystem to one of the two or to a dedicated third channel of the AI controlled multi-channel power divider/combiner 30.

In normal propulsion mode, upshifts and downshifts are signaled by the transmission control module 76 over the on board or cloud based AI network via the cable 19. The signaled shift request is used by the AI controlled multi-channel power divider/combiner 30 in which algorithms determine the preferred gear ratio selection to propel the vehicle with real time condition and route position awareness. The VFD or variable frequency drive 22 is then signaled to de-torque and reduce or increase rpm of the electric drive motor 32, thus allowing an autonomous upshift or downshift to be performed. The AI algorithms are designed for enhanced performance over a route or the efficient harvesting of terrain potential energy produced by 32 by manipulating the capture of and generated energy from the rolling mass. A driver can advance a shift (by about 75 rpm) by pressing the proper up/down button contained in the shift selector 11 (up for upshifts, down for downshifts) when the transmission is within 75 rpm of the AI controlled multi-channel power divider/combiner 30 AI algorithm-based shift point. The gear display 10 shows the status of the shift and acts as the human interface. The current gear may be displayed solid, at the start of the shift, an may continually be displayed solid until the transmission 74 is pulled to the neutral position by the signal of the TCM 76 after receiving a signal from the AI multi-channel power divider/combiner 30 to the VFD variable frequency drive 22 to de-torque and change speed based on feedback from the encoder 36 mounted to the rear shaft of the electric drive motor 32. While the transmission 74 is in neutral and synchronizing for the target gear, the target gear may be flashed on the display 10. When the shift is complete, the new current gear may be displayed solid 10. Driver control of a shift can be restored simply by placing the in-cab shift controller 11 in the manual position. This allows the driver to override all shift commands from both the TCM 76 and the AI controlled multi-channel power divider/combiner 30.

Figure 4:
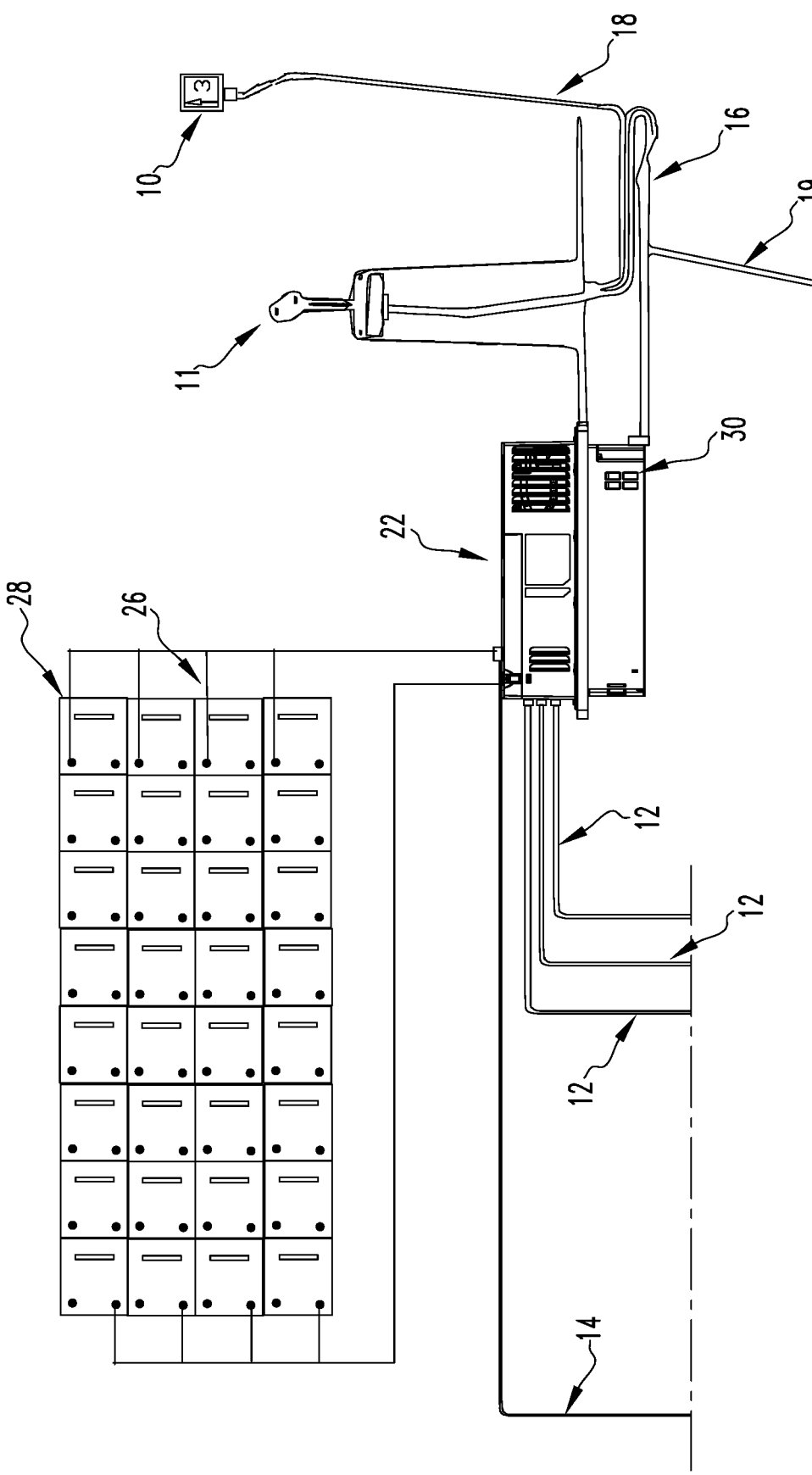
FIG. 4 is a partially schematic side view illustrating control components of the system of FIG. 3.

FIG. 4 depicts an embodiment of the driver control circuits and interface of the invention used within a power-split series electric hybrid heavy vehicle. The shift handle 11 is connected to the AI controlled multi-channel power divider 30 and on board network via 16, transmission TCM via 19, human interface dash display 10 via 18. The in-cab shifting device in manual position overrides all control of the AI controlled multi-channel power divider 30, allowing for a manual reduced power mode control of the variable frequency drive 22 powering the electric drive motor via 12 with encoder feedback via 14 while a protection mode remains intact to control the SOC of the battery or battery pack 26, 28. The driver, by returning the shift device 11 to automatic position, returns autonomous control to the AI controlled multi-channel power divider 30 with an indication of this control mode displayed via the in cab dash display 10.

Figure 5:
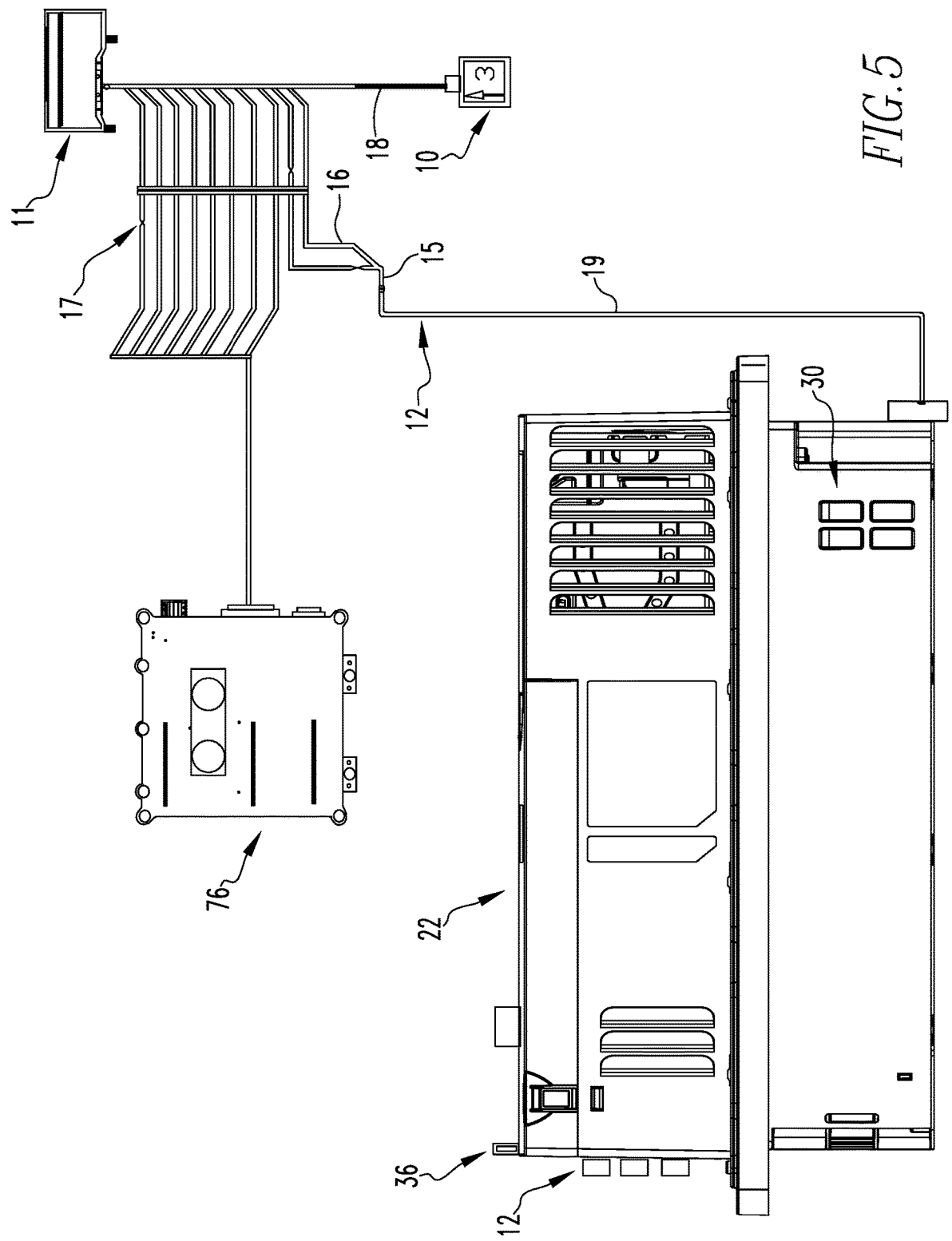
FIG. 5 is a partially schematic illustration of a control system for the system of FIG. 3.

FIG. 5 depicts an embodiment of the control circuits and interface of the invention with an electronic shift manual transmission used within a power-split series electric hybrid heavy vehicle. The electronic shift manual transmission control module TCM 76 is connected to the on board network through a J1939 communication port via 17, enabling normal communications of the node within the onboard network via cabling 16,19,17,18. Added control of operation and shifting of the transmission is provided by means of the AI controlled multi-channel power divider 30. Torque and de-torque along with speed control and system manipulation through the variable frequency drive 22 and output through power ports 12 with feedback provided be the encoder port 36. Driver override of the AI controlled multi-channel power divider 30 is provided by means of the in-cab shift device 11, the status of which is displayed by means of a dash-mounted indicator 10.

Figure 6:
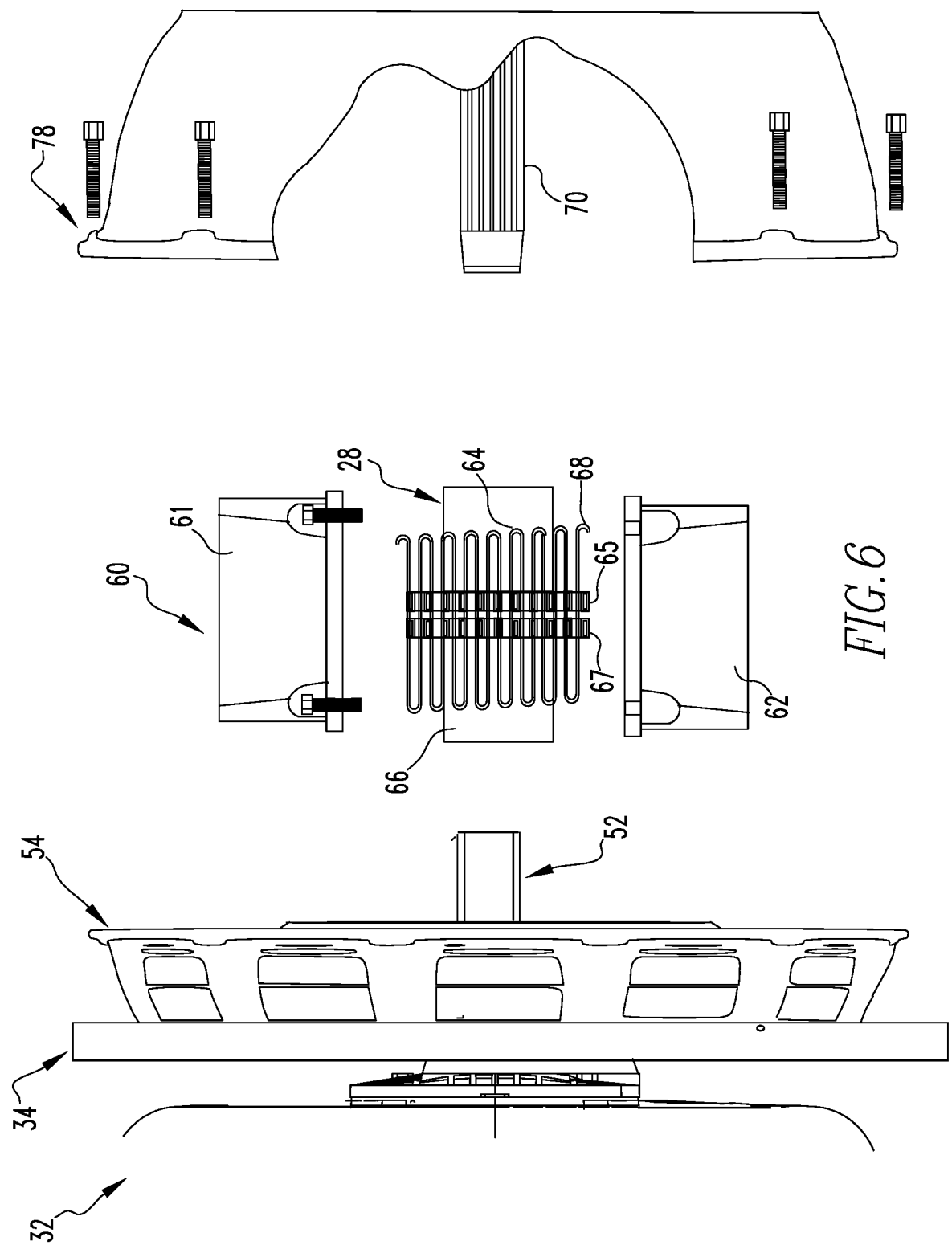
FIG. 6 is a partially schematic side view illustrating components of a direct coupling assembly between an electric motor drive shaft and transmission drive shaft in accordance with an embodiment of the present invention.

FIG. 6 illustrates a direct coupling assembly 60 that couples the output drive shaft 52 of the electric drive motor 32 to the input drive shaft 70 of the electronic shift transmission 74. The bell housing 54 of the motor 32 is mounted on an adapter plate 34, and the bell housing 78 of the transmission is attached to the motor bell housing 54 by bolts. The output drive shaft 52 of the electric drive motor 32 fits into a keyed opening of the first coupling hub 66, and the input drive shaft 70 of the transmission 74 fits into a splined opening of the second coupling hub 64. The adapter plate 34 may provide connection between an SAE NEMA motor face and a modified SAE sized automotive bell housing 54 that mates to the SAE standard bell housing 78 of the electronic shift transmission 74. Motive power is transmitted from the motor output shaft 52 through the direct coupling 60 to the electronic shift transmission shaft 70 through the geared ratios contained within the transmission. The direct coupling assembly 60 is protected from the environment and retains lubricating grease by means of a split cover 61, 62. The cover 61, 62 provides for periodic maintenance and repairs of the coupling. Power may be generated by the reverse flow of terrain potential and kinetic energy through the system.

Figure 7:
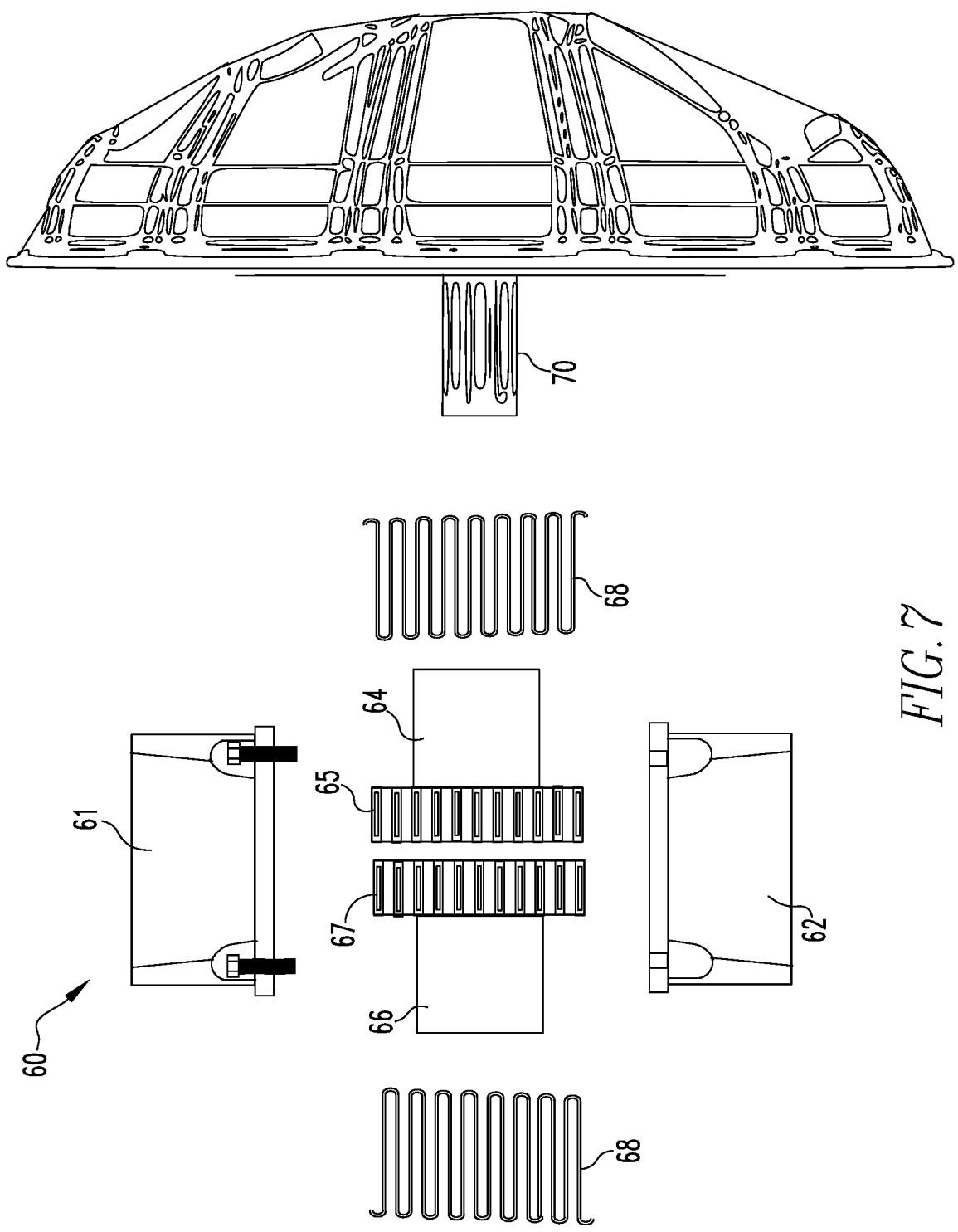
FIG. 7 is an exploded side view of the direct coupling assembly of FIG. 6.
Figure 8:
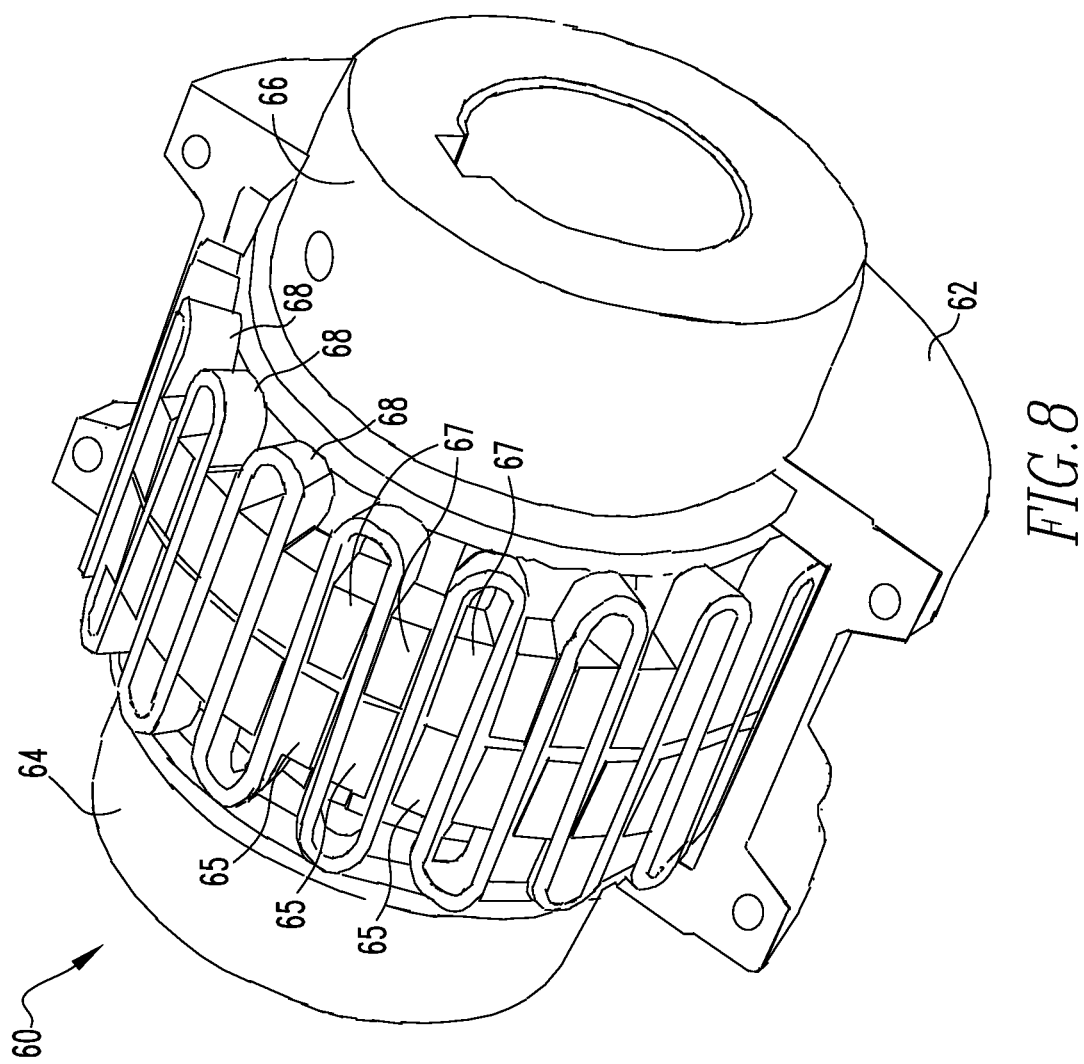
FIG. 8 is an isometric view of the direct coupling assembly of FIG. 6.

FIGS. 7 and 8 show details of the direct coupling 60. The direct coupling 60 includes a first coupling hub 66 having gear teeth 67 at an end thereof, and a second opposing coupling hub 64 having gear teeth 65 at an end thereof adjacent to the gear teeth 67 of the first coupling hub 66. A connecting spring 68 extends between the first and second coupling hubs 66 and 64, and engages the gear teeth 67 and 65. In the embodiment shown, the connecting spring 68 is split into two halves.

The connecting spring 68 transfers rotational movement and torque between the first and second coupling hubs 66 and 64, while allowing a limited amount of relative movement or play therebetween. The relative movement or play can be in the rotational direction of the hubs 66, 64, in the axial direction and/or in the radial direction. The shapes and sizes of the gear teeth 65 and 67, and the connecting spring 68, may be selected to allow a limited amount of relative rotation between the first and second hubs 66 and 64, for example, less than 100, or less than 1°, or less than 0.10, or less than 0.010 relative rotational movement. In certain embodiments, the relative rotational movement between the first and second hubs 66 and 64 may range from 0.002 to 0.0150, or from 0.006 to 0.0110, or from 0.008 to 0.010.

The shapes and sizes of the gear teeth 65 and 67, and the connecting spring 68, may be selected to allow a limited amount of relative axial movement between the first and second hubs 66 and 64, for example, less than 0.12 inch, or less than 0.06 inch, or from 0.008 to 0.022 inch, or from 0.012 to 0.188 inch, or from 0.012 to 0.015 inch as measured between the opposing end faces of the first and second hubs 66 and 64. For example, for a nominal axial separation of 0.125 inch between the first and second hubs 66 and 64, the relative axial movement may be limited within a range of from 0.0625 inch to 0.1875 inch, or within a range of from 0.008 to 0.022 inch.

The shapes and sizes of the gear teeth 65 and 67, and the connecting spring 68, may be selected to allow a limited amount of relative radial or transverse movement therebetween as measured in a direction perpendicular to the axial direction of the first and second hubs 66 and 64. For example, the relative transverse movement may be less than 0.5 percent, or less than 0.1 percent, or from 0.002 to 0.01 percent, or from 0.002 to 0.008 percent, or from 0.002 to 0.005 percent with such percentages being based upon the outer diameter of the gear teeth 65 and 67.

The connecting spring 68 may be provided in a serpentine configuration as shown in FIGS. 6-8 in which a strip of spring steel or other suitable material fits within aligned spacings between the teeth of the gear teeth 65 and 67. The strip may have a typical width of from 0.25 to 0.75 inch, or about 0.5 inch, and may have a typical thickness of from 0.0625 to 0.1875 inch, or about 0.125 inch. The length of each strip within a given serpentine section may typically range from 2 to 6 inches, or from 3 to 4 inches.

The gear teeth 67 and 65 of the first and second hubs 66 and 64 may have axial tooth lengths of from 0.5 to 2 inches, or about 1 inch, circumferential tooth widths of from 0.25 to 0.5 inch, or about 0.375 inch, and radial tooth depths of from 0.25 to 0.75 inch, or about 0.5 inch. The circumferential spacing between adjacent teeth may be from 0.125 to 0.25 inch, or about 0.1875 inch measured at the outer diameter of the gear teeth 67 and 65. The circumferential tooth spacing, as measured at the base of each tooth, may be from 0.0625 to 0.1875 inch, or about 0.125 inch.

For purposes of the description above, it is to be understood that the invention may assume various alternative variations and step sequences except where expressly specified to the contrary. It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A vehicle power transfer system comprising:
    an electric drive motor;
    an electric power controller comprising an artificial intelligence AI controlled multi-channel power divider and a variable frequency drive structured and arranged to selectively feed electrical current from the variable frequency drive to the electric drive motor and receive electrical current from the electric drive motor;
    an electric generator connected to the multi-channel power divider of the electric power controller;
    at least one battery connected to the multi-channel power divider of the electric power controller;
    an electronic shift transmission; and
    a direct coupling assembly between an output drive shaft of the electric drive motor and an input drive shaft of the electronic shift transmission structured and arranged to transfer torque from the output drive shaft of the electric drive motor to the input drive shaft of the electronic shift transmission in a drive mode, and to transfer torque from the input drive shaft of the electronic shift transmission to the output drive shaft of the electric drive motor in an energy collection mode.

2. The vehicle power transfer system of claim 1, wherein the energy collection mode is generated by kinetic energy from a rolling mass of the vehicle that is transferred from wheels of the vehicle through the electronic shift transmission, the direct coupling assembly and the electric drive motor to provide regenerative power to the system.

3. The vehicle power transfer system of claim 1, wherein in the energy collection mode electric current transferred from the electric drive motor to the electric power controller is selectively supplied to the at least one battery.

4. The vehicle power transfer system of claim 1, wherein the electronic shift transmission comprises multiple gears that are selectively engaged during the energy collection mode.

5. The vehicle power transfer system of claim 4, wherein a higher gear ratio is selected during the energy collection mode when the at least one battery is more fully charged, and a lower gear ratio is selected during the energy collection mode when the at least one battery is less fully charged.

6. The vehicle power transfer system of claim 1, wherein the direct coupling assembly comprises:
    a first coupling hub drivingly connected to the output drive shaft of the electric drive motor;
    a second coupling hub drivingly connected to the input drive shaft of the electronic shift transmission; and
    a connecting spring contacting the first and second coupling hubs.

7. The vehicle power transfer system of claim 6, wherein the first and second coupling hubs comprise opposing first and second sets of gear teeth, and the connecting spring engages the first and second sets of gear teeth.

8. The vehicle power transfer system of claim 7, wherein the connecting spring comprises at least one section comprising a strip of material formed into a generally serpentine shape structured and arranged to engage the first and second sets of gear teeth.

9. The vehicle power transfer system of claim 8, wherein the connecting spring comprises spring steel.

10. The vehicle power transfer system of claim 8, wherein the strip of material of the connecting spring has a width of from 0.25 to 0.75 inch and a thickness of from 0.0625 to 0.1875 inch.

11. The vehicle power transfer system of claim 8, wherein the connecting spring comprises two of the sections, and each section has a generally hemispherical cross-sectional shape.

12. The vehicle power transfer system of claim 8, further comprising a split housing covering the first and second sets of gear teeth and the connecting spring.

13. A direct coupling assembly for use in a vehicle power train assembly, the direct coupling assembly comprising:
    a first coupling hub structured and arranged for driving connection to an output shaft of an electric drive motor;
    a second coupling hub structured and arranged for driving connection to an input drive shaft of an electronic shift transmission; and
    a connecting spring contacting the first and second coupling hubs structured and arranged to transfer torque from the first coupling hub to the second coupling hub in a drive mode, and to transfer torque from the second coupling hub to the first coupling hub in an energy collection mode.

14. The direct coupling assembly of claim 13, wherein the first and second coupling hubs comprise opposing first and second sets of gear teeth, and the connecting spring engages the first and second sets of gear teeth.

15. The direct coupling assembly of claim 14, wherein the connecting spring comprises at least one section comprising a strip of material formed into a generally serpentine shape structured and arranged to engage the first and second sets of gear teeth.

16. The direct coupling assembly of claim 15, wherein the connecting spring comprises spring steel.

17. The direct coupling assembly of claim 15, wherein the strip of material of the connecting spring has a width of from 0.25 to 0.75 inch and a thickness of from 0.0625 to 0.1875 inch.

18. The direct coupling assembly of claim 15, wherein the connecting spring comprises two of the sections, and each section has a generally hemispherical cross-sectional shape.

19. The direct coupling assembly of claim 15, further comprising a split housing covering the first and second sets of gear teeth and the connecting spring.

20. A vehicle power transfer system comprising:
an electric drive motor;
an electric power controller structured and arranged to selectively feed electrical current to the electric drive motor and receive electrical current from the electric drive motor;
an electric generator connected to the electric power controller;
at least one battery connected to the electric power controller;
an electronic shift transmission; and
a direct coupling assembly between an output drive shaft of the electric drive motor and an input drive shaft of the electronic shift transmission structured and arranged to transfer torque from the output drive shaft of the electric drive motor to the input drive shaft of the electronic shift transmission in a drive mode, and to transfer torque from the input drive shaft of the electronic shift transmission to the output drive shaft of the electric drive motor in an energy collection mode, wherein the direct coupling assembly comprises:
a first coupling hub drivingly connected to the output drive shaft of the electric drive motor;
a second coupling hub drivingly connected to the input drive shaft of the electronic shift transmission; and
a connecting spring contacting the first and second coupling hubs.

* * * * *